United States Patent
Baker et al.

(10) Patent No.: US 7,113,977 B1
(45) Date of Patent: Sep. 26, 2006

(54) BLOCKING ELECTRONIC MAIL CONTENT

(75) Inventors: La Veria Baker, Atlanta, GA (US); David Scott, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 735 days.

(21) Appl. No.: 10/180,230

(22) Filed: Jun. 26, 2002

(51) Int. Cl.
*G06F 15/16* (2006.01)

(52) U.S. Cl. ...................................... 709/206; 709/207

(58) Field of Classification Search ................ 709/206, 709/207
See application file for complete search history.

(56) References Cited

U.S. PATENT DOCUMENTS

| | | | | |
|---|---|---|---|---|
| 6,199,102 B1 * | 3/2001 | Cobb | ......................... | 709/206 |
| 6,321,267 B1 * | 11/2001 | Donaldson | .................. | 709/229 |
| 6,654,787 B1 * | 11/2003 | Aronson et al. | ............ | 709/206 |
| 6,772,196 B1 * | 8/2004 | Kirsch et al. | ................ | 709/206 |
| 2002/0129111 A1 * | 9/2002 | Cooper | ....................... | 709/207 |
| 2003/0009698 A1 * | 1/2003 | Lindeman et al. | .......... | 713/201 |
| 2004/0122730 A1 * | 6/2004 | Tucciarone et al. | ........... | 705/14 |

* cited by examiner

*Primary Examiner*—Rupal Dharia
*Assistant Examiner*—Chirag R. Patel
(74) *Attorney, Agent, or Firm*—Merchant & Gould

(57) ABSTRACT

A method and system are provided for allowing an electronic mail user to block receipt of undesirable electronic mail content. An email user contacts her email service provider via an Internet-based web page. The user may designates certain keywords or text strings and certain email addresses associated with email she considers undesirable. Subsequently, when email messages are sent to the user, those messages are intercepted by the user's email service provider at an email server. A database lookup is performed for the keywords, text strings or email addresses designated as undesirable by the user. The email service provider does not deliver email containing or from the designated undesirable keywords or text strings and certain email addresses. The user may designate a return message to be sent back to the sender of the undesirable email to alert the sender not to send future messages to the user containing the undesirable keywords or text. If desired, in an effort to cause the sender to abandon the user's email address as a target for unsolicited and undesirable email, the email service provider may send a return message to the sender that indicates that the user's email address is not operable and that the email to the user is undeliverable.

24 Claims, 4 Drawing Sheets

BLOCKING ELECTRONIC MAIL CONTENT

TECHNICAL FIELD

The present invention is directed to a method and system for blocking electronic mail content.

BACKGROUND

With the advent of computers and distributed computing environments, including the Internet, and a variety of intranets, computer users regularly send and receive electronic mail to and from friends, acquaintances and business associates. Unfortunately, often electronic mail users receive electronic mail from unknown senders that is undesirable or even offensive in some manner. Similarly, sometimes electronic mail users receive undesirable electronic mail from known senders. For example, an electronic mail user may receive a message alerting the user of a computer virus to avoid. The user may operate her computer as part of a system that regularly scans for viruses, and therefore, the user would rather not receive virus notices by electronic mail. For another example, often, electronic mail users receive electronic mail from unknown or undesirable senders containing text or attachments that include highly offensive material such a pornographic language or images.

Accordingly, there is a need in the art for a method and system for allowing an electronic mail user to block receipt of undesirable electronic mail. There is further need for a method and system for allowing an electronic mail user to block receipt of undesirable mail and to send a return message to the sender of the undesirable mail indicating that such undesirable mail should not be sent to the user in the future. It is with respect to these and other considerations that the present invention has been made.

SUMMARY

Embodiments of the present invention solve the above and other problems by allowing an electronic mail user to block receipt of undesirable electronic mail content. An electronic mail (email) user contacts her email service provider via an Internet-based web page. The user may designate certain keywords or text strings and certain email addresses associated with email she considers undesirable. Subsequently, when email messages are sent to the user, those messages are intercepted by the user's email service provider at an email server. A database lookup is performed for the keywords, text strings or email addresses designated as undesirable by the user. The email service provider reviews electronically the email sent to the user to determine whether any of the designated keywords, text strings or email addresses are contained in the message. If so, the email service provider does not deliver the email to the user, thus blocking the undesirable email from being delivered to the user. If desired, the user may request that she be alerted by the email service provider anytime email addressed to her has been blocked from delivery.

According to another aspect of the invention, the user may designate a return message to be sent back to the sender of the undesirable email to alert the sender not to send future messages to the user containing the undesirable keywords or text. If desired, in an effort to cause the sender to abandon the user's email address as a target for unsolicited and undesirable email, the email service provider may send a return message to the sender that indicates that the user's email address is not operable and that the email to the user is undeliverable.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

The following description of an embodiment of the present invention is made with reference to the above-described drawings wherein like numerals refer to like parts or components throughout the several figures. The present invention is directed to a method and system for blocking electronic mail content from delivery to an email user.

Figure 1:
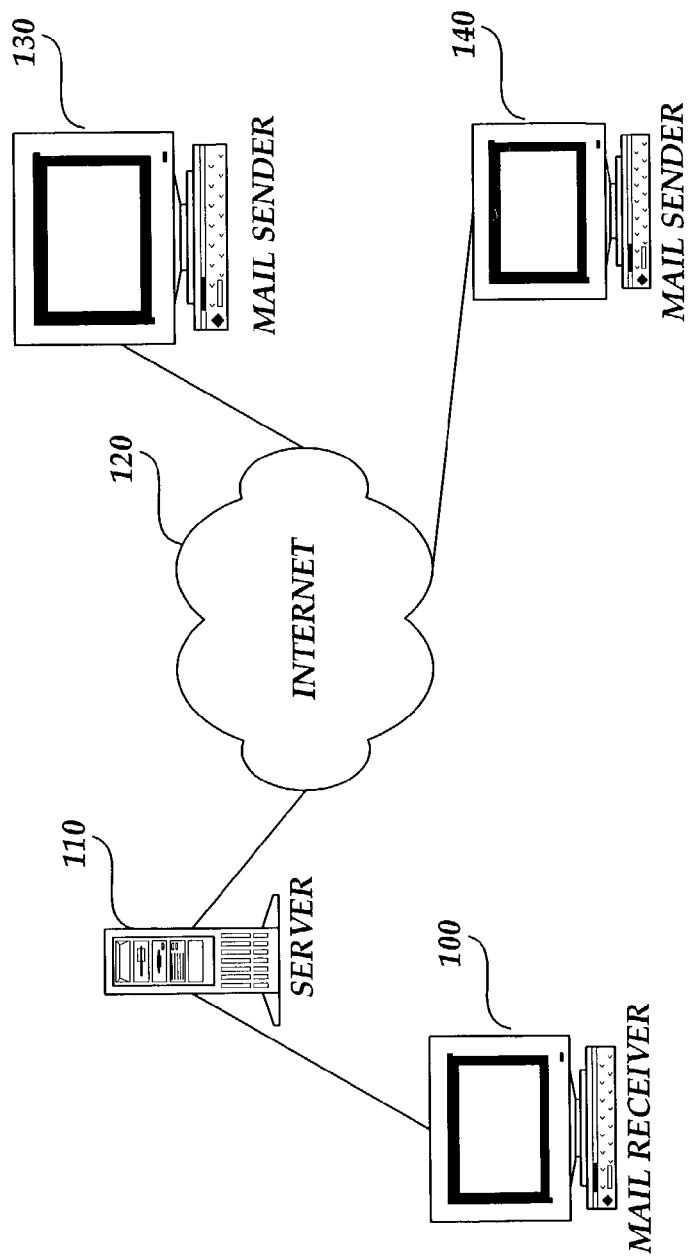
FIG. 1 is a block diagram illustrating components of a distributed computing environment that provides an operating environment for the present invention.

FIG. 1 is a block diagram illustrating components of a distributed computing environment that provides an operating environment for the present invention. An email receiver computer 100 is representative of a computer operated by an electronic mail user and is functionally connected to an electronic mail server 110 for receiving email content across the Internet 120 from a variety of electronic mail senders from computers 130 and 140. The computer 100 operated by the email user and receiver is representative of any general purpose computer or network of computers having an operating system, a memory storage system and a computer software application for sending and receiving electronic mail. The computers 130 and 140 of the electronic mail senders are likewise general purpose computers equipped with computer software applications and necessary operating systems and memory systems for generating, sending and receiving electronic mail messages to and from the email user at the email user's computer 100. As should be understood, each of the computers 100, 130 and 140 may include a collection of computers forming a local network of computers for sending and receiving electronic mail messages.

The Internet 120 is well known to those skilled in the art as essentially a packet-switched network based on the family of protocols known as Transmission Control Protocol/Internet Protocol (TCP/IP) which is a family of networking protocols providing communication across interconnected networks between computers with diverse hardware architectures and between various computer operating systems.

Operation of the Internet 120 and the TCP/IP transmission protocols is well known to those in the skilled in the art.

The electronic mail server 110 includes a computer or collection of computers that respond to client computers such as computers 100, 130 and 140. According to an embodiment of the present invention, the electronic mail server includes computer software applications for receiving electronic mail messages from a variety of email senders across the Internet 120 or across another distributed computing environment such as an intranet and for forwarding those email messages on to the intended receiver at the computer 100. The electronic mail server also contains memory capacity for receiving a plurality of keywords, text strings, or email addresses designated as undesirable by the email user. Designated keywords, text-strings, or email addresses received by the email user are maintained in a database by the electronic mail service provider at the email server 110.

According to an embodiment of the present invention, when an electronic mail message is sent to the email user at the computer 100, that message is intercepted by the email service provider at the email server 110. A computer software application at the email server 110 parses all text contained in the email message and compares that parsed text with keywords, text strings and email addresses designated as undesirable by the email user and maintained in the database at the email server 110. If it is determined that the email message contains any of the undesirable keywords, text strings, or email addresses, the email message is blocked from delivery to the computer 100 for receipt by the email user. Additional functionality associated with blocking delivery of the undesirable message is described below with reference to FIGS. 2, 3 and 4.

Figure 2:
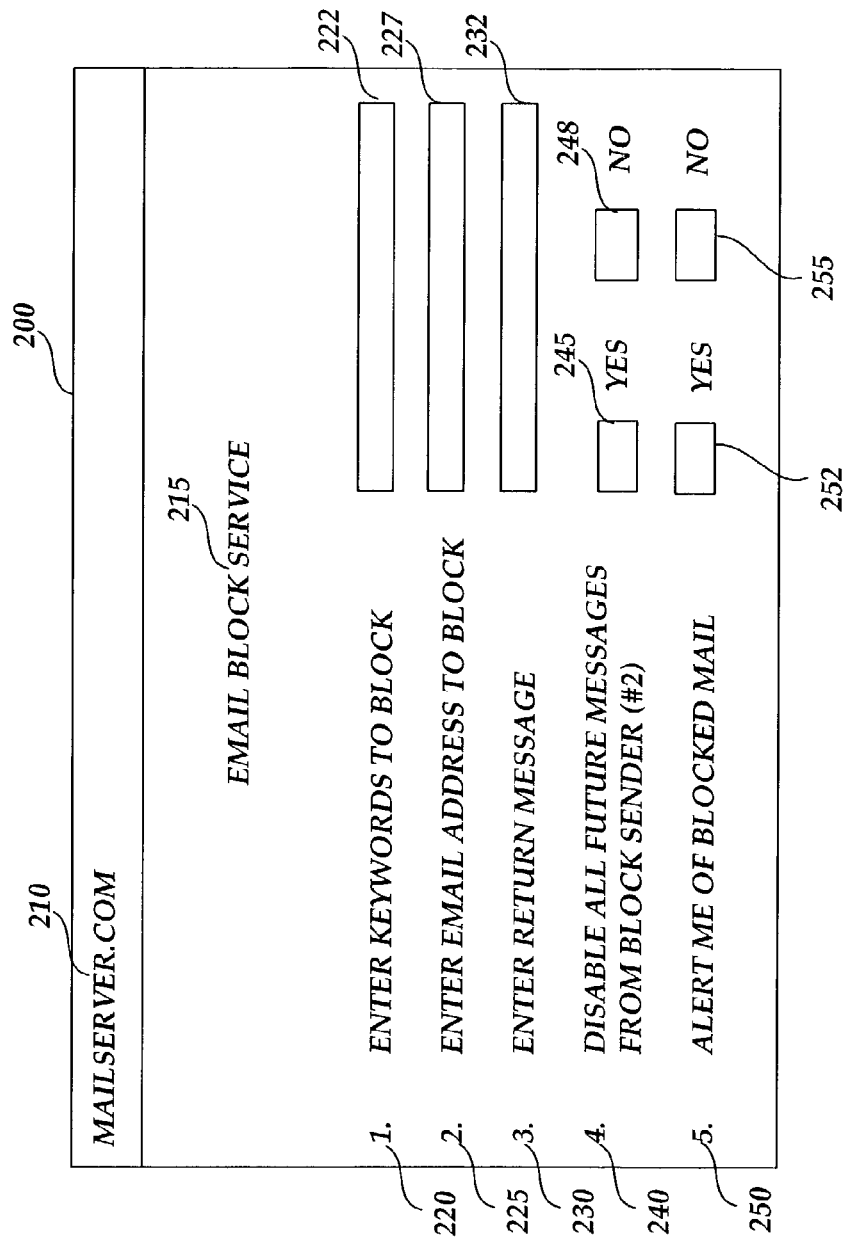
FIG. 2 illustrates a computer screen shot of a dialogue box with which a user provides instructions to an electronic mail service provider for blocking undesirable electronic mail content according to an embodiment of the present invention.

FIG. 2 illustrates a computer screen shot of a dialogue box with which a user provides instructions to an electronic mail service provider for blocking undesirable electronic mail content according to an embodiment of the present invention. As described in more detail below, according to an embodiment of the present invention, an email user contacts her email service provider at the email server 110 via her computer 100 by opening an Internet-based web page 200, illustrated in FIG. 2, to provide instructions to the email service provider for blocking undesirable email messages. As should be understood by those skilled in the art, the page 200 may be a dialogue box of a computer software application provided by the email service provider for communicating with the email service provider via another suitable distributed computing environment, such as an inter-office intranet. The page 200 includes a data entry area 215 where the email user may provide instructions to the email service provider for blocking undesirable email messages. A text box 222 is provided for allowing the email user to enter keywords or text strings considered undesirable by the user. For example, if the user desires not to receive email messages concerning virus alerts, the user may enter the keyword "virus." For another example, if the user desires not to receive any pornographic materials, the user may enter a text string the user anticipates may be included in electronic mail messages containing pornographic materials such as "pornographic photos." A text box 227 is included for entering email addresses from which the user would like to block delivery of content to the user's computer 100. For example, if the user would like to block all email messages from the address "advertisements@serviceprovider.com," the user may enter that email address in the text box 227 to instruct the email service provider to block from delivery all email messages sent from that address.

A text box 232 is provided for entering a return message to be sent from the email service provider via the email server 110 to the email sender at the sender's computer 130 or 140. For example, the user may enter a message such as "please do not send any future email messages to my address." Accordingly, anytime an email message is received containing designated keywords, text strings, or email addresses, and after the undesirable message is blocked from delivery to the user at the user's computer 100, a return email message will be sent to the sender as entered by the user in the text box 232. According to another embodiment, the user may instruct the sending of a return message that will cause the sender to believe that the user's email address is not an operable address. Many email senders will continue to send unsolicited and undesirable email messages to the user regardless of the user's instructions to the contrary. According to this embodiment, a return email message may be sent from the email server 110 to the sender, such as "message undeliverable—please check the electronic mail address." After receiving the return email, the sender of the unsolicited or undesirable email message must engage in a time-consuming investigation to determine the proper email address for the recipient, and consequently, many such senders will drop the user's email address from future email transmissions.

Check boxes 245 and 248 allow the user to designate that all future messages from a given sender or containing a given keyword or text string are to be blocked from delivery to the user. That is, if the user selects the "yes" checkbox 245, all future email messages containing the designated keywords, text strings, or email addresses entered in the text boxes 222 or 227 will be blocked from delivery to the user. Checkboxes 252 and 255 are provided for allowing the user to instruct the email service provider to alert the user if an email message containing the keywords, text, strings or email addresses entered in the text boxes 222 or 227 have been blocked from delivery to the user. If a given email message is from a friend, acquaintance, or business associate of the user, the user may desire to block delivery of the email message, but the user may want to be alerted of the existence of the email message and of the fact that the message was blocked from delivery.

Figure 3:
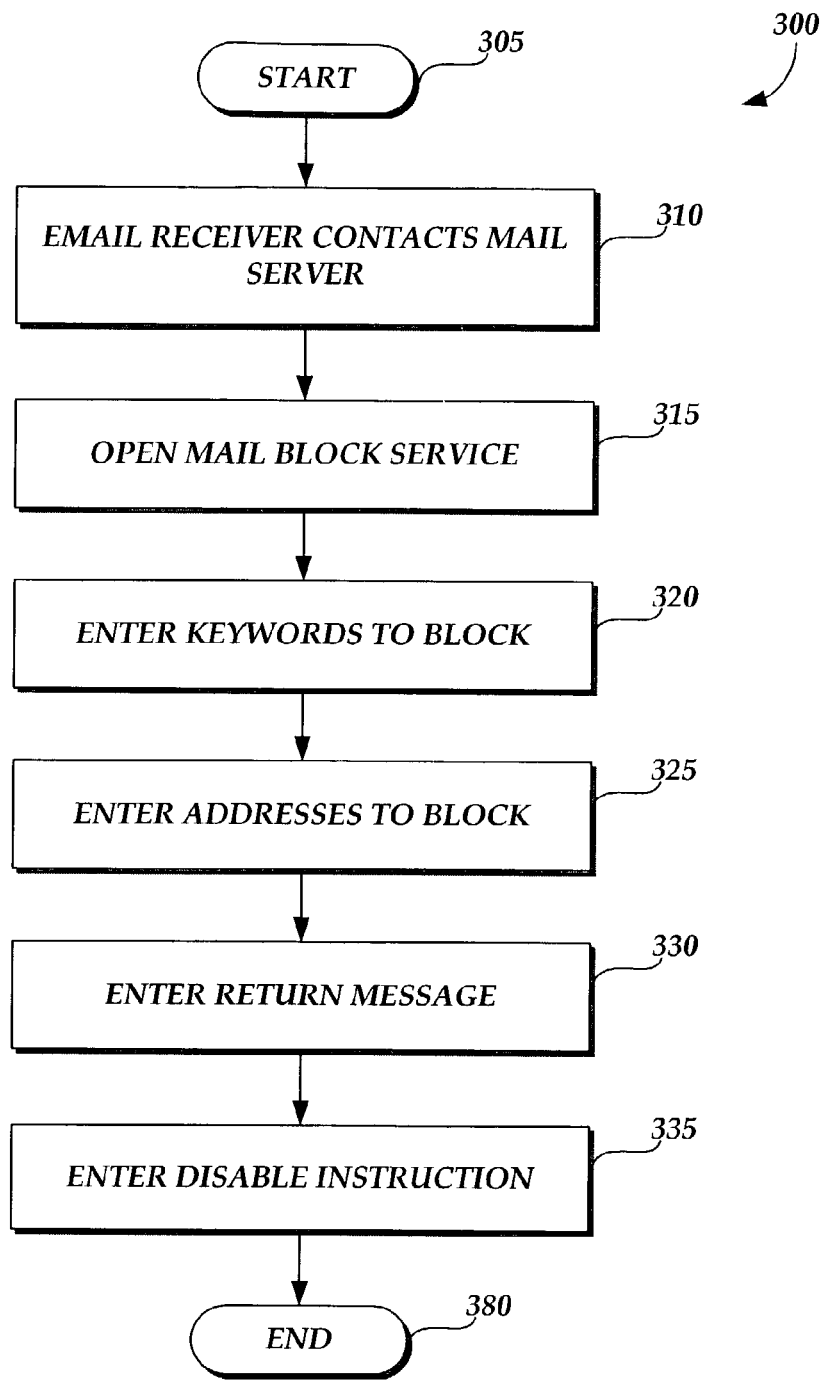
FIG. 3 illustrates a logical flow of the steps performed by a method and system of the present invention for providing instructions to an electronic mail service provider for blocking undesirable email content according to an embodiment of the present invention.

FIG. 3 illustrates a logical flow of the steps performed by a method and system of the present invention for providing instructions to an electronic mail service provider for blocking undesirable email content according to an embodiment of the present invention. The method 300 begins at start step 305 and moves to step 310 where the email receiver contacts the email service provider at the server 110 to provide the email service provider with instructions for blocking undesirable email messages from delivery to the email receiver. At step 315, the email user opens the email "block service" page 200, illustrated in FIG. 2, to enter instructions for blocking certain email from delivery. At step 320, the email user/receiver completes the text box 222 with any undesirable keywords or text strings associated with email messages that the user would like to have blocked from delivery. For example, if the user does not want to receive any messages regarding computer virus alerts, the user may type the keyword "virus." If the user does not want to receive any email messages containing "credit card advertisements," the user may type a text string such as "credit cards" within the same paragraph as "offer." It should be understood by those skilled in the art that any number or combination of keywords or text strings may be entered by the user at step 320 to selectively block email messages containing those keywords or text strings.

At step 325, the user may complete a text box 227 to enter particular email addresses from which the user desires to block incoming email messages. For example, if the user regularly receives annoying advertisements from an email address of "advertisements@serviceprovider.com" the user may enter that email address into the textbox 227 to prevent future email addresses. At step 330, the user enters any desired return messages into the text box 332. For example, a user might enter a return message such as "please do not send me any future email messages" that will be automatically returned to a sender of a blocked email message. At step 335, the user may instruct the email service provider to disable all future messages from the blocked email message sender, and the user may request that she be alerted of the occurrence of a blocked email message. As described above, according to one embodiment of the present invention, the user may instruct the email service provider to send a message such as "message undeliverable" to cause the sender to believe that the email address of the user is an inoperable address in order to cause the sender to stop sending email messages to the user.

Once the user completes the block service page 200, the user transmits the information to the email service provider at the email server 110. At the email server 110, the instructions input by the user are stored in a database of instructions associated with the user's email address for later use by the email server 110 for blocking certain email messages to the user.

Figure 4:
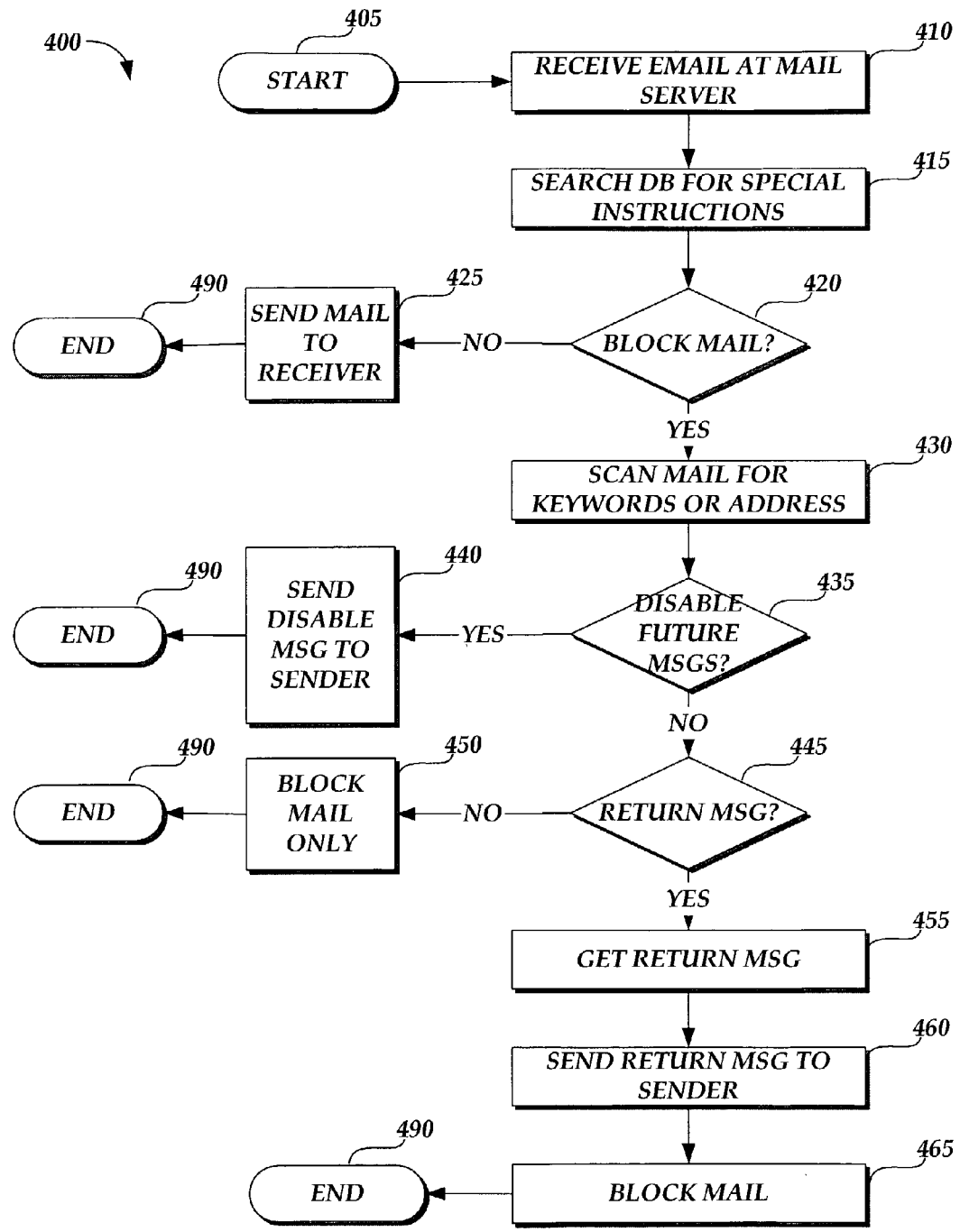
FIG. 4 illustrates a logical flow of the steps performed by a method and system of the present invention for blocking undesirable email content from delivery to an email user according to an embodiment of the present invention.

FIG. 4 illustrates a logical flow of the steps performed by a method and system of the present invention for blocking undesirable email content from delivery to an email user according to an embodiment of the present invention. The method 400 starts at step 405 and proceeds to step 410 where the email service provider receives an email at the email server 110 from the mail sender 130 directed to the user at her computer 100. At step 415 an email blocking software application, resident at the email server 110 intercepts the email message directed to the user. Utilizing the user's email address, the email blocking application searches a database for email blocking instructions provided by the user associated with the user's email address. That is, the email blocking application searches for keywords, text strings, email addresses, and other instructions provided by the user, as described with reference to FIGS. 2 and 3 above.

At step 420, a determination is made as to whether email blocking instructions are present for the user's email address. If not, the method proceeds to step 425 and the email is sent to the user at the user's computer 100. The methods end at step 490. If email blocking instructions are found from the email user, the method proceeds to step 430, and the email blocking application at the email server 10 purges the email message addressed to the email user for keywords, text strings, or email addresses provided by the email user which if found in a received email message designate that email message to be blocked from delivery to the user.

At step 435, the email blocking application checks the instructions from the email user to determine whether all future messages from this email address should be disabled. If so, the method proceeds to step 440 and a future messages disablement return message is sent to the sender. As described above, the email server 10 may return a message to the sender such as "message undeliverable—email address inoperable." Alternatively, a message may be sent to the sender simply instructing the sender that no further email messages from the sender will be delivered to the user's email address.

If the user has not instructed the service provider to disable all future messages, the method proceeds to step 445, and a determination is made as to whether the user provided a return email message with her instructions to the email service provider. If no return message was provided by the user, the method proceeds to step 450, and the email message is blocked from delivery to the user, but no return message is forwarded to the sender. If the user does provide a return email message to be sent to the sender of a blocked email message, the method proceeds to step 455, and the email blocking application searches the database to obtain the return message entered by the user. At step 460, the email blocking application at the mail server 110 populates a return email message with a designated return message, such as "please do not send future email messages to my address." Alternatively, a return message may be made specific to the keywords or text strings considered undesirable by the user. For example, a return message may be sent to the sender such as "please do not send future email messages containing the keywords [blank] or the text strings [blank], where the keyword blanks and text string blanks are completed by the email blocking software application with keywords or text strings found in the email message that are designated as undesirable by the user. At step 460, the return email message is forwarded to the sender by the mail server 110. At step 465, the email message is blocked from delivery to the user, and the method ends at step 490.

As described, a method and system are provided for allowing an email user to block the delivery to the user's computer of unsolicited and/or undesirable email messages. It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method of blocking electronic mail delivery, comprising:
    receiving email blocking instructions directed to an electronic mail (email) service provider to block delivery of email messages to an email receiver, the email blocking instructions describing aspects of an undesirable email;
    receiving an email message addressed to the receiver at an email server operated by the email service provider;
    at the email server, searching a database for the email blocking instructions received from the email receiver;
    at the email server, parsing the email message addressed to the email receiver for information associated with the email blocking instructions; and
    if the email message addressed to the email receiver contains information associated with the email blocking instructions from the email receiver,
        blocking at the email server, according to the email blocking instructions directed to the electronic mail service provider, delivery of the email message addressed to the email receiver from delivery to the email receiver, and
        providing from the email server, according to the email blocking instructions directed to the electronic mail service provider, a return email message to a sender of the blocked email message alerting the sender of the blocked email message to send no future email messages to an email address of the email receiver, the return email message indicating one of that the blocked email message is undeliverable because the email address of the email receiver is inoperable and that the sender should send no further email messages to the email address of the email receiver.

2. The method of claim 1, further comprising, prior to receiving the email blocking instructions, contacting the email service provider at the email server for receiving the instructions to block delivery of email messages to the email receiver.

3. The method of claim 1, wherein receiving the email blocking instructions further comprises receiving keywords associated with email messages to be blocked from delivery to the email receiver.

4. The method of claim 1, wherein receiving the email blocking instructions further comprises receiving text strings embedded in email messages to be blocked from delivery to the email receiver.

5. The method of claim 1, wherein receiving the email blocking instructions includes receiving electronic mail addresses from which all electronic mail messages are to be blocked from delivery to the email receiver.

6. The method of claim 1, wherein receiving the email blocking instructions includes receiving a return email message to be sent to the sender of a blocked email message.

7. The method of claim 6, wherein receiving a return message to be sent to the sender of a blocked email message includes receiving a return message alerting the sender to send no future email messages to an email address of the email receiver.

8. The method of claim 6, wherein receiving a return message to be sent to the sender of a blocked email message includes receiving a return message to be sent to the sender that the email message addressed to the email receiver at the email server was undeliverable.

9. The method of claim 8, wherein the return message further includes a message from the email service provider to the sender that the email address of the email receiver is not operable.

10. The method of claim 1, wherein receiving the email blocking instructions further comprises receiving an instruction to block all future email messages from a blocked email sender.

11. The method of claim 1, wherein receiving the email blocking instructions includes receiving an instruction to alert the email receiver of the occurrence of an email message that has been blocked from delivery to the email receiver.

12. The method of claim 1, the method further comprising, after receiving the email blocking instructions, the instructions at the email server database.

13. The method of claim 1, wherein searching a database for email blocking instructions from the email receiver includes searching for keywords, text strings or email addresses associated with email messages to be blocked from delivery to the email receiver.

14. The method of claim 13, wherein parsing the email message addressed to the email receiver for information associated with the email blocking instructions further comprises parsing the email message addressed to the email receiver for keywords, text strings or email addresses associated with email messages to be blocked from delivery to the email receiver.

15. The method of claim 14, wherein blocking at the email server delivery of the email messages addressed to the email receiver from delivery to the email receiver includes:

if the email message addressed to the email receiver contains keywords, text strings or email addresses associated with the email messages to be blocked from delivery to the email receiver, blocking at the email server delivery of the email message addressed to the email receiver from delivery to the email receiver.

16. The method of claim 1, wherein searching a database for email blocking instructions from the email receiver includes searching a database for a return message to be sent to the sender of the email messages addressed to the email receiver.

17. The method of claim 16 further comprising of sending from the email server a return email message to the sender of the email message addressed to the email receiver.

18. The method of claim 17, wherein sending from the email server a return email message to the sender of the email message addressed to the email receiver includes sending a return message that future messages associated with the keywords, text strings, or email addresses are not to be sent to the email address of the email receiver.

19. The method of claim 17 wherein sending from the email server a return email address to the sender of the email message addressed to the email receiver includes sending a return message that the email message addressed to the email receiver was undeliverable.

20. The method of claim 17 wherein sending from the email server a return email address to the sender of the email message addressed to the email receiver includes sending a return message that the email message addressed to the email receiver was inoperable.

21. A system for blocking electronic mail delivery, comprising:

means for receiving email blocking instructions directed to an electronic mail (email) service provider to block delivery of email messages to an email receiver, the email blocking instructions describing aspects of an undesirable email;

means for receiving an email message addressed to the receiver;

means for searching a database for the email blocking instructions received from the email receiver;

means for parsing the email message addressed to the email receiver for information associated with the email blocking instructions;

means for blocking delivery of the email message addressed to the email receiver if the email message addressed to the email receiver contains information associated with the email blocking instructions from the email receiver; and means for providing from the email server, according to the email blocking instructions directed to the electronic mail service provider, a return email message to a sender of the blocked email message alerting the sender of the blocked email message to send no future email messages to an email address of the email receiver, the return email message indicating one of that the blocked email message is undeliverable because the email address of the email receiver is inoperable and that the sender should send no further email messages to the email address of the email receiver.

22. The system of claim 21, further comprising:

means for receiving a return email message to be sent to the sender of a blocked email message; and means for sending the return email message to the sender of the blocked email message.

23. The system of claim 22, further comprising means for sending a return message to the sender of the blocked email message that the email message addressed to the email receiver was undeliverable.

24. The system of claim 23, further comprising means for sending a return message to the sender of the blocked email message that the email address of the email receiver is not operable.

* * * * *